United States Patent
Imai et al.

[11] Patent Number: 5,891,576
[45] Date of Patent: Apr. 6, 1999

[54] CARD

[75] Inventors: Toshibumi Imai; Akihiko Kobayashi; Tsutomu Shikakubo; Masayuki Taniguchi; Kazuya Yabusa; Testuo Aizawa; Motoko Yoshikawa, all of Tokyo, Japan

[73] Assignee: Toppan Printing Co., Ltd., Tokyo, Japan

[21] Appl. No.: 541,593

[22] Filed: Oct. 10, 1995

Related U.S. Application Data

[63] Continuation of Ser. No. 258,620, Jun. 15, 1994, abandoned.

[30] Foreign Application Priority Data

Jun. 16, 1993 [JP] Japan ..................... 5-144738

[51] Int. Cl.$^6$ ....................................... B32B 9/04
[52] U.S. Cl. ..................... 428/411.1; 428/480; 428/481; 428/537.5; 428/692; 523/124; 523/128
[58] Field of Search ................ 283/7, 87; 523/124, 523/125, 128; 428/411.1, 913, 914, 480, 481, 537.5, 692; 435/277

[56] References Cited

U.S. PATENT DOCUMENTS

| | | | |
|---|---|---|---|
| 3,808,404 | 4/1974 | Riggs | 235/61.12 M |
| 4,980,023 | 12/1990 | Salkinoja-Salonen | 162/135 |
| 5,122,561 | 6/1992 | Matsumoto et al. | 524/323 |
| 5,138,029 | 8/1992 | Nishioka et al. | 528/354 |
| 5,197,763 | 3/1993 | Whalen | 283/76 |
| 5,292,860 | 3/1994 | Shiotani et al. | 528/361 |
| 5,336,871 | 8/1994 | Colgate, Jr. | 235/380 |
| 5,346,817 | 9/1994 | Akiyama et al. | 435/135 |
| 5,346,929 | 9/1994 | Guttag | 523/124 |

FOREIGN PATENT DOCUMENTS

| | | |
|---|---|---|
| 0 232 705 | 8/1987 | European Pat. Off. . |
| 4-62054 | 2/1992 | Japan . |
| 5-85088 | 4/1993 | Japan . |
| 7-40688 | 2/1995 | Japan . |
| 7-266771 | 10/1995 | Japan . |

*Primary Examiner*—Elizabeth Evans
*Attorney, Agent, or Firm*—Armstrong, Westerman, Hattori, McLeland & Naughton

[57] ABSTRACT

A card having a paper as a base material laminated with decomposable plastic layers having such properties as durability, banding resistance, water resistance, chemical resistance, waterproofness, surface smoothness, glossiness end workability. Any visible information/design portion and/or a magnetic recording portion may be formed as required. The present invention improves the durability of a card using paper as a base material and provides the card which spontaneously decomposes even when left after being discarded.

18 Claims, 1 Drawing Sheet

CARD

This application is a Continuation of application Ser. No. 08/258,620, filed Jun. 15, 1994, now abandoned.

BACKGROUND OF THE INVENTION

1. Field of the Invention

The present invention relates to a disposable card used for prepaid cards, admission tickets, or a disposable card-type material used for letters of guarantee, securities and the like, and more particularly to a card whose entire composition has decomposition properties.

2. Background Art

Currently, cards are utilized in wide fields such as ID cards or membership cards identifying social standing, cash cards, credit cards, prepaid cards, passes or traffic tickets having monetary values, or letters of guarantee, securities and the like.

Cards which have increased most in the number of cards utilized among those as mentioned above are the so-called prepaid cards in which monetary value information has been recorded equivalent to a certain amount of money previously paid.

Usually, such cards after being sold to users are discarded when users use up the full amount of money recorded. Generally such prepaid cards comprise plastics such as polyethylene terephthalate (PET) resin as a card base material, in which pattern and character information are printed on the card base material, while digital information is recorded on a magnetic recording portion or an optical recording portion provided on the card base material. Although such plastic cards after being fully used are currently disposed of by incineration or by landfill as a waste, plastic waste, when being incinerated, causes burning temperature to become higher, leading to problems with the durability of incinerators and with the environmental pollution due to combustion gas, while plastic waste, when being used for landfill, does not decompose, remaining as it is, so that it remains permanently as refuse, leading to problems with the effect on natural environment.

Heretofore, there have been produced and utilized cards employing paper as their base material, which paper is easy to be discarded for incineration or landfill and less expensive in manufacturing cost, so that paper has been considered to be an optimum card material with respect to the above-mentioned, currently-discussed environmental problems.

Also recently, as disclosed in Japanese Laid-Open Patent Application No. 57-150393, Japanese Laid-Open Patent Application No.59-220192, Japanese Laid-Open Patent Application No.51-93991, Japanese Laid-Open Patent Application No.63-260912 and Japanese Laid-Open Patent Application No.57-150393, plastics, which are decomposable under natural environment such as light or underground condition, have been developed, have been particularly for throwaway products, and have now commercially been available partly. With respect to the cards field, Japanese Laid-Open Patent Application No.5-42786 and Japanese Laid-Open Patent Application No.5-85088 by the present applicant disclose that decomposable plastics are used for card base material. Problems that the Invention is to solve However, where paper is used for card base material as shown in FIG. 3, considering the suitability for cards, such as durability, bending resistance, water resistance, chemical resistance, waterproofness, surface smoothness, glossiness and workability, paper is inferior in function in all respects. Thus sole paper application is limited to a temporary one such as traffic tickets, admission tickets and railway tickets, and not suitable for the above-mentioned prepaid cards used for a certain period. For such a purpose, although it is considered that an outer layer of plastics such as polyethylene, polypropylene, polyvinyl chloride and polyethylene terephthalate, or those other than plastics such as aluminum foil are laminated as a protective layer on a paper bass material as shown in FIG. 4, these cards are inferior in discardability and have a disadvantage not significantly different from plastic cards.

A card in which the base material itself is composed of a decomposable plastic gradually decomposes due to its plastic function after being discarded. However, cards are to be produced with consideration to convenience in themselves and to a problem with card manufacture, so that where a decomposable plastic is used only for a card base material, problems as shown below exist.

The problems exist in that first a card is required to have a certain thickness from the strength and user-friendliness points of view, so that when the card is molded, a warpage develops on the card surface; that the decomposition of a decomposable plastic requires a longer time corresponding to such thickness; and that since a decomposable plastic is expensive, the card itself becomes expensive.

SUMMARY OF THE INVENTION

Thus, the present invention is made to solve the above-mentioned problems, and the card is the one in which at least one plastic layer having decomposition properties is laminated on one side or both sides of a card base material made of paper end the like.

The card is the one in which said plastic layer is a decomposable plastic decomposing through light or microorganism.

The card is the one in which a magnetic recording layer is formed on said card base material or said plastic layer.

The card is the one in which an optical recording layer is formed on said card base material or said plastic layer.

According to the card of the present invention, by the use of a decomposable paper as a card base material, and of decomposable plastics having properties such as durability, bending resistance, water resistance, chemical resistance, waterproofness, surface smoothness, glossiness and workability, as an outer layer, the durability of the entire card is improved and the card, even if left after being discarded, will spontaneously decompose.

DETAILED DESCRIPTION OF THE PREFERRED EMBODIMENTS

With reference to drawings, embodiments of the present invention will be explained in detail.

Figure 1:
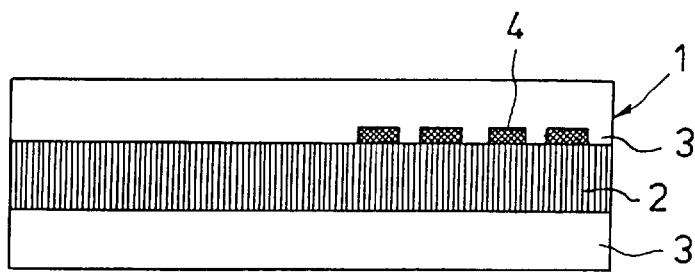
FIG. 1 is a sectional view showing one example of a card of the present invention.
Figure 2:
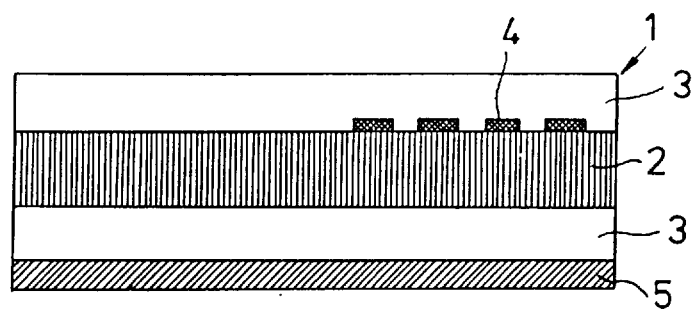
FIG. 2 is a sectional view showing another example of a card of the present invention.

FIGS. 1 and 2 show sectional views of a card of the present invention.

A card 1 of the present invention shown in FIG. 1 is formed by laminating decomposable plastic layers 3 on a paper base material 2 such as paper.

The paper base material 2 is a sheet to be generally-used for a statistic card, a cardboard and the like, and employs the one having high smoothness, strong resilience, no warpage, uniform thickness and stable dimensions. If the above-mentioned conditions are satisfied, even recycled paper can be used.

The decomposable plastic layers 3, for which a decomposable plastic having decomposition properties equal to or better than the above-mentioned paper base material is suitable, can employ, for example, microorganism-derived polyesters such as 3-hydroxybutyric acid-3-hydroxyvaleric acid copolymer P (3HB-3HV), aliphatic polyesters such as polycaprolactam (PCL), polyglycolides such as polylactate, and polyvinyl alcohol-starch composite materials, and may employ mixture or laminated material of these decomposable plastics, The decomposable plastic layers 3 laminated on the paper base material 2 may be used if it has certain decomposition properties, and different kinds of decomposable plastic layers 3 may be used for each surface of the paper base material 2.

A nondecomposable material such as various additives and polymers can be added to these decomposable plastics if the material to the decomposable plastics ratio is 50% or less in weight. An addition of nondecomposable material with a ratio of 50% or more is not preferable because it causes decomposition properties to be remarkably decreased and a problem with machining to be developed.

The method of laminating a decomposable plastic layer on a paper base material can employ the conventional method of manufacturing common plastic laminated paper, which includes various methods such as lamination of plastic film onto paper base material, melt extrusion coating of plastic onto paper base material and so on.

The laminating method suitable for the card of the present invention employs a T-die type mono-layer or multi-layer extrusion laminating method, which includes multi-manifold method and field block method either of which may be used.

Furthermore, a method of heat lamination of paper with film may be used.

With the T-die type multi-layer extrusion laminating method, together with polyolefin, straight-chain copolyester, i.e. 3-hydroxybutyric acid-3-hydroxyvaleric acid copolymer having a low processing temperature are extruded, causing an extra heat to be absorbed by the polyolefin having a large specific heat, so that the straight-chain copolyester of 3-hydroxybutyric acid-3-hydroxyvaleric acid copolymer will not decompose thermally.

For lamination, an adhesive agent is often required to use. Although for the manufacture of the card of the present invention, due to less coating quantity the kind of adhesive agent is not particularly specified, it is preferable to use an aqueous adhesive agent not affecting the decomposition properties of plastic laminated paper.

By means of the above-mentioned method, the decomposable plastic layers 3 are laminated on the paper base material 2 to form the card. The printing and machining onto the card can employ a method similar to conventional paper/plastic cards, such that by a printing technique such as offset printing, screen printing and gravure printing, a visible information/design portion 4 such as pattern and character are printed on the paper base material 2 or the decomposable plastic layers 3, which are then machined to a card size by the use of a punching machine to manufacture the card, Further, an information recording layer such as a magnetic recording layer or an optical recording layer can be formed on the card, in which case the magnetic recording layer 5 is previously formed on the paper base material 2 before the decomposable plastic layer 3 is laminated thereon, or the magnetic recording layer 5 is formed after the decomposable plastic layer 3 is laminated on the paper base material 2. The forming method includes coating of a dispersion in which magnetic recording material is dispersed in a binder and the like, or lamination of a sheet having formed a magnetic recording layer.

A specific embodiment of the present invention will be given and explained in detail hereinafter.

EXAMPLE 1

The straight-chain copolyester of 3-hydroxybutyric acid-3-hydroxyvaleric acid copolymer P (3HB-3HV) having decomposition properties (made by Zeneka Co. in England: trade-name "Biopole" containing hydroxyvaleric acid by 12%) was laminated on both surfaces of a rolled cardboard (non-coated ivory board: 180 g/m$^2$) to a thickness of 30 $\mu$m by the T-die melt extrusion method to form the card 1 as shown in FIG. 1.

The periodic observation of the decomposing state of the prepared card after being buried in the soil of a farm revealed that after one month the plastic layer 3 was almost completely decomposed and only the paper base material 2 remained though the shape was held; and that after six months the shape of the card was not held and only about half of the paper base material 2 remained.

Comparative Example 1

Figure 3:
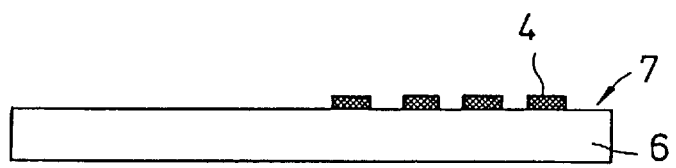
FIG. 3 is a sectional view of a conventional card formed of only a paper.

A card 7 having a composition shown in FIG. 3 was produced by using a rolled cardboard (non-coated ivory board: 230 g/m$^2$) as a paper base material 6. The periodic observation of the decomposing state of the card after being buried in the soil of a farm revealed that after six months the shape was not held and only about half of the paper base material remained.

Comparative Example 2

Figure 4:
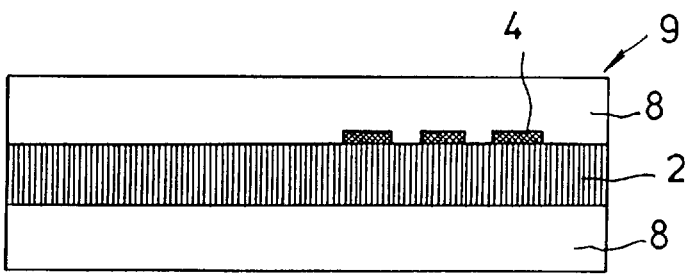
FIG. 4 is a sectional view of a conventional card in which polyethylene layers are laminated.

By using a plastic laminated paper formed by laminating 15 $\mu$m-thick polyethylene layer 8 instead of the straight-chain copolyester of 3-hydroxybutyric acid-3-hydroxyvaleric acid copolymer P (3HB-3HV) of the example 1, a card 9 having a similar composition was produced as shown in FIG. 4. The periodic observation of the decomposing state of the card after being buried in the soil of a farm revealed that even after six months the shape was held and the surface polyethylene layer was not changed to an extant that the propagation of mold was found locally on the surface of the paper base material on which the polyethylene layer was not laminated.

Table 1 shows the results of comparison in strength, water resistance and the like among the example 1, and the comparative examples 1 and 2.

TABLE 1

| | | Example 1 | Comparative Example 1 | Comparative example 2 |
|---|---|---|---|---|
| Tensile strength (kgf) | Longer side | 20.7 | 18.5 | 21.8 |
| | Shorter side | 12.5 | 10.7 | 11.6 |
| Tear strength (gf) | Longer side | 283 | 252 | 289 |
| | Shorter side | 262 | 223 | 255 |
| Bending resistance strength (times) | Longer side | 1012 | 846 | 952 |
| | Shorter side | 1049 | 953 | 1021 |
| Rupture strength (kgf/cm$^2$) | | 8.6 | 6.5 | 8.8 |
| Rigidity (gf/cm) | Longer side | 45.6 | 39.8 | 46.2 |
| | Shorter side | 24.7 | 22.5 | 25.6 |
| Water resistance | | No unusual state | Shape changed | No unusual state |

The card of comparative example 1, though the paper itself has decomposition properties, is inferior in strength and resistance, while the one of comparative example 2, though it is superior in strength and resistance, has no decomposition properties in itself and a disadvantage of preventing the decomposition properties of the paper base material due to the coating of the polyethylene.

On the contrary, the card used in the example according to the present invention has a card workability similar to the card by conventional plastic laminated paper, and its plastic layer, even when left in an activated sludge tank, substantially decomposed, while its paper base material absorbed water content to cause the fiber to become disentangled, thereby retaining little shape.

According to the present invention as described above, the card is composed by laminating of a plastic having decomposition properties on a paper bass material, so that the paper base material does not lose its original decomposition properties, while the plastic having decomposition properties decomposes together with the paper base material, and in addition the card having a laminated composition is superior in strength/resistance.

Using paper as a base material allows the thickness of a plastic having decomposition properties, that is, its usage to be reduced and thus makes it possible to reduce its manufacturing cost, while the card has almost the same strength/ resistance as the one using conventional plastics, so that it can sufficiently withstand applications such as current throwaway cards.

The plastic having decomposition properties used for the card of the present invention, though inferior in physical properties and workability to conventional plastics, may improve its physical properties and workability by being mixed with an additive or a non-decomposable plastic to such an extent as not to deteriorate decomposition properties.

What is claimed is:

1. A card for recording character and pattern information, said card consisting essentially of:
   a substantially planar layer of uniform thickness of a resilient base material selected from the group consisting of paper and card board, and
   at least one plastic layer which is a decomposable plastic having decomposition properties equal to or better than those of the base material, which is at least one member selected from the group consisting of microorganism-derived polyesters, aliphatic polyesters, polyglycolides and polyalcohol-starch composite materials, said plastic layer being laminated on the layer of the base material,
   wherein character and pattern information can be printed on at least one of said layer of the base material and plastic layer, and the card in its entirety is substantially decomposable spontaneously when held in activated sludge.

2. The card according to claim 1, wherein said decomposable plastic is a microorganism-derived polyester.

3. The card according to claim 2 wherein said microorganism-derived polyester is 3-hydroxybutyric acid-3-hydroxyvaleric acid copolymer P.

4. The card according to claim 1, wherein said decomposable plastic is an aliphatic polyester.

5. The card according to claim 4, wherein said aliphatic polyester is a polycaprolactam.

6. The card according to claim 1, wherein said decomposable plastic is a polyglycolide.

7. The card according to claim 6, wherein said polyglycolide is a polyacetate.

8. The card according to claim 1, wherein said decomposable plastic is a polyalcohol-starch composite material.

9. The card according to claim 1, wherein the plastic layer has a thickness of 30 $\mu$m.

10. The card according to claim 9, wherein said microorganism-derived polyester is 3-hydroxybutyric acid-3-hydroxyvaleric acid copolymer P.

11. The card according to claim 10, wherein said aliphatic polyester is a polycaprolactam.

12. The card according to claim 11, wherein said polyglycolide is a polyacetate.

13. A card for recording character, pattern and digital information, said card consisting essentially of:
    a substantially planar layer of uniform thickness of a resilient base material selected from the group consisting of paper and cardboard,
    at least one plastic layer which is a decomposable plastic having decomposition properties equal to or better than those of the base material, which is at least one member selected from the group consisting of microorganism-derived polyesters, aliphatic polyesters, polyglycolides and polyalcohol-starch composite materials, said plastic layer being laminated on the layer of the base material, and
    at least one layer for recording digital information selected from the group consisting of a magnetic recording layer and an optical recording layer, said layer for recording digital information being formed on either one of said layer of the base material and said plastic layer,
    wherein character and pattern information can be printed on at least one of said layer of the base material and plastic layer, said plastic layer and said base material being substantially decomposable spontaneously when held in activated sludge.

14. The card according to claim 13, wherein said decomposable plastic is a microorganism-derived polyester.

15. The card according to claim 13, wherein said decomposable plastic is an aliphatic polyester.

16. The card according to claim 13, wherein said decomposable plastic is a polyglycolide.

17. The card according to claim 13, wherein said decomposable plastic is a polyalcohol- starch composite material.

18. The card according to claim 13, wherein the plastic layer has a thickness of 30 $\mu$m.

* * * * *